L. HERMAN.
AUTOMOBILE.
APPLICATION FILED OCT. 1, 1910.
990,263.
Patented Apr. 25, 1911.
2 SHEETS—SHEET 1.
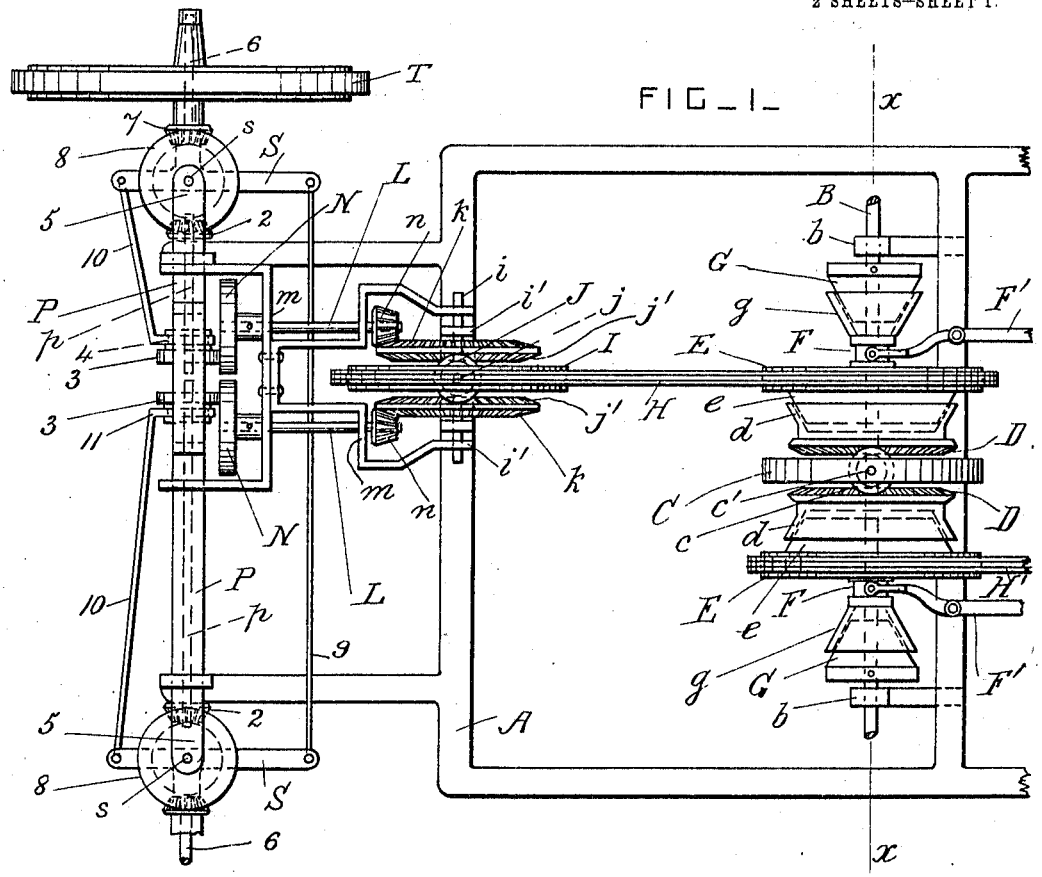
FIG_1_
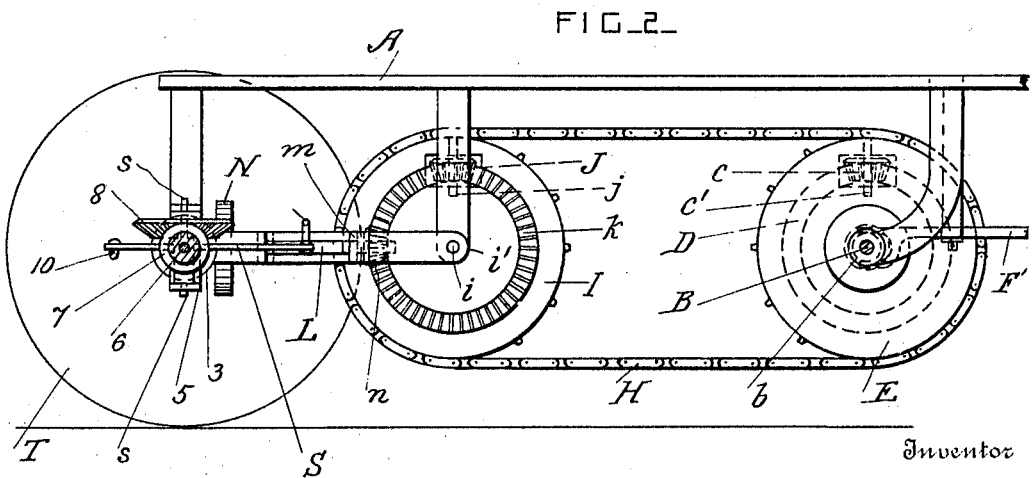
FIG_2_
Witnesses
J. B. Middleton
Chas. M. Baruch
Inventor
Louis Herman,
By Herbert W. Jenner.
Attorney L. HERMAN.
AUTOMOBILE.
APPLICATION FILED OCT. 1, 1910.
990,263.
Patented Apr. 25, 1911.
2 SHEETS—SHEET 2.
FIG_3_
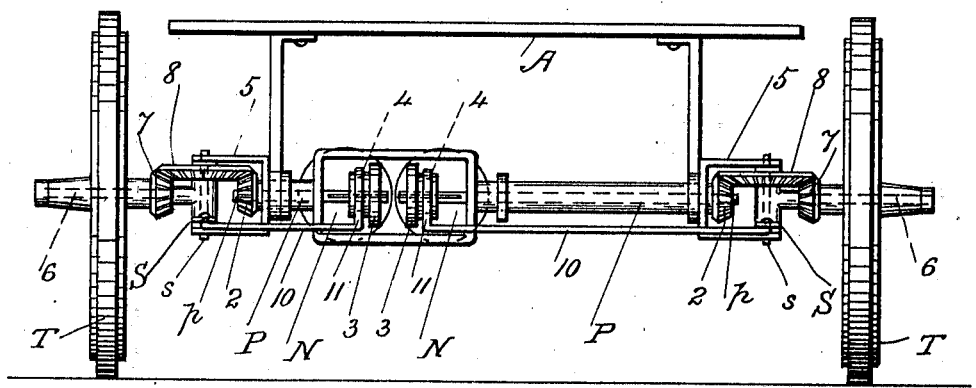
FIG_4_
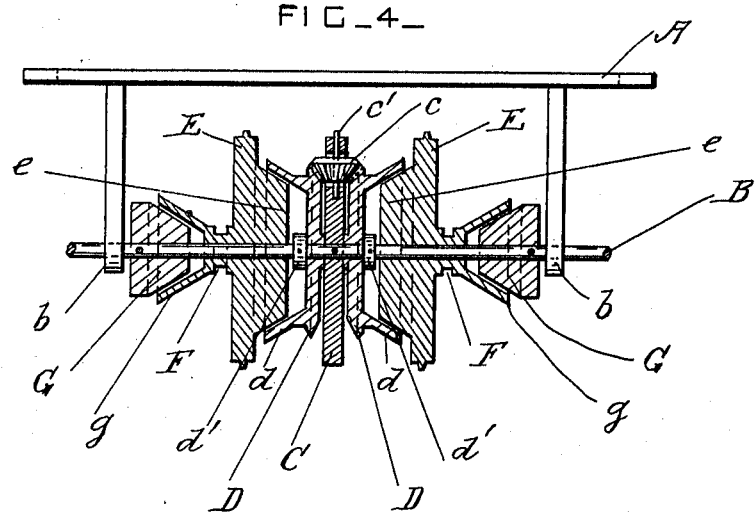
Witnesses
L. B. Middleton
Chas M. Baruch
Inventor
Louis Herman,
Herbert W. Jenner.
By
Attorney

UNITED STATES PATENT OFFICE.

LOUIS HERMAN, OF HILLSBORO, MISSOURI.

AUTOMOBILE.

990,263. Specification of Letters Patent. Patented Apr. 25, 1911.

Application filed October 1, 1910. Serial No. 584,946.

*To all whom it may concern:*

Be it known that I, LOUIS HERMAN, a citizen of the United States, residing at Hillsboro, in the county of Jefferson and State of Missouri, have invented certain new and useful Improvements in Automobiles; and I do hereby declare the following to be a full, clear, and exact description of the invention, such as will enable others skilled in the art to which it appertains to make and use the same.

This invention relates to automobiles; and it consists in the novel construction and combination of the parts hereinafter fully described and claimed whereby the front and rear road wheels are driven and steered.

In the drawings, Figure 1 is a plan view of the driving mechanism, from below. Fig. 2 is a side view of the same. Fig. 3 is a front end view of a portion of the steering mechanism. Fig. 4 is a longitudinal section taken on the line x—x in Fig. 1.

A is a frame of any approved construction for supporting all the driving mechanism. As the driving and steering devices are alike at each end of the automobile the description will be confined to the devices at one end of it.

B is the main driving shaft to which power is applied by any suitable motor. This driving shaft is arranged crosswise at the middle part of the machine, and it is journaled in bearings b.

C is a driving disk which is rigidly secured on the shaft B, and c is a beveled toothed equalizing pinion carried by a pin c' and free to revolve in an opening in the disk C.

D are two beveled toothed wheels journaled loose on the shaft B, and arranged one on each side of the disk C and in gear with the pinion c. The wheels D are prevented from sliding on the shaft by means of collars d', and d are friction clutch-members formed on or secured to the wheels D.

E are two sprocket wheels for transmitting the power to the ends of the machine, arranged one on each side of the wheels D. These sprocket wheels E are free to slide on the shaft B, and they are also journaled loose on it.

Each sprocket wheel E has a clutch-member e on one side of it for engaging with the adjacent clutch-member d. Each sprocket wheel E has also a circumferential groove F in its hub, and a friction clutch-member g arranged at the opposite side of it from the clutch-member e.

G are friction clutch-members rigidly secured upon the driving shaft B for the clutch-members g to engage with.

F' are levers pivoted to the frame A in any approved manner and engaging with the grooves F so that the two sprocket wheels and their clutch-members e and g can be slid longitudinally on the shaft B independent of each other.

H and H' are two similar drive chains which engage with the sprocket wheels E. These chains extend in opposite directions, one being adapted to drive the mechanism at the front end of the automobile, and the other to drive the similar mechanism at its rear end. The drive chain H passes over a sprocket wheel I carried by a shaft i and mounted in suitable bearings i' on the frame A. The sprocket wheel I carries a beveled toothed equalizing pinion J which is mounted on a pin j and arranged to revolve in an opening in the sprocket wheel I. Beveled toothed wheels j' and k are secured back to back and are journaled loose on the shaft i, the wheels j' being arranged in gear with the pinion J.

L are two similar shafts arranged longitudinally of the machine and parallel to each other. These shafts L are journaled in bearings m on the frame A.

N are two similar friction disks secured on the shafts L, at one end thereof; and n are two similar beveled toothed driving pinions secured at the other ends of the shafts L and arranged on gear with the wheels k.

P are bearings arranged in line with each other and secured to the frame A parallel to the shaft i. Driving cross shafts p are journaled in the bearings P, and 2 are beveled toothed pinions secured on the outer ends of the shafts p. Friction driving wheels 3 are splined on the adjacent end portions of the cross shafts p, and are provided with circumferential grooves 4 in their hubs.

S are levers pivoted by pins s to brackets 5 on the outer ends of the bearings P, and 6 are axle spindles which project from the levers S.

T are road wheels journaled on the axle spindles 6, and 7 are beveled toothed pinions secured on the hubs of the road wheels. Beveled toothed wheels 8 are journaled in the brackets 5 concentric with the pins s, and these wheels gear into the pinions 7 and 2.

A connecting-rod 9 is pivoted to the two levers S so that they work simultaneously and in the same direction. Rods 10 are also pivoted to the said levers S, and are operatively connected to collars 11 which engage with the circumferential grooves 4 of the friction driving wheels. The levers S are operated by means of the rod 9 which can be grasped by hand, but any approved mechanism can be applied to the rod 9 to permit the levers to be worked from any convenient seat in the automobile without grasping the rod 9.

Any other approved form of friction clutch can be used in carrying out this invention, the form shown and described being adopted merely as an illustration.

When the two sprocket wheels E are coupled to the driving disk C the two drive-chains are operated simultaneously, and the beveled pinion and toothed wheels equalize the driving force so that the driving mechanism at each end of the machine is driven with equal force. One or the other of the two sprocket wheels E can be coupled to the driving disk C, so that the driving mechanism at one end only of the machine can be driven, if desired. If any accident should occur to the driving disk C or to the toothed wheels connected to it, one or both of the sprocket wheels E can be driven from the friction clutch members G, by sliding the sprocket wheels outwardly.

Any suitable motor or engine is used for driving the shaft B and the driving disk C, the power being preferably applied to the shaft B. When the driving is effected by means of the clutches G, there is no differential action, but in case of a break down this method of driving, although limited, can be utilized to advantage.

The drive chain imparts motion to the driving mechanism at the end of the machine and the road wheels are revolved by means of the intermediate wheels. When the machine is steered to make a turn the rod 9 is moved to operate the steering levers in the usual way, and the friction driving wheels 3 are moved from their normal positions against the friction disks N. One driving wheel 3 is moved toward the center of its disk N, and the other driving wheel is moved away from the center of its disk. In this manner the road wheel on the outside of the curve is driven at a greater circumferential speed than the road wheel on the inside of the curve. The sprocket wheel I with its pinion J and the wheels j' equalize the driving force imparted to the disks N.

What I claim is:

1. The combination, with a frame, two driving shafts journaled longitudinally in the frame and arranged side by side, and means for revolving the said shafts; of friction driving disks secured on the said shafts, two cross shafts arranged in line with each other, slidable friction driving wheels splined on the said cross shafts and bearing against the said disks, beveled toothed pinions secured on the said cross shafts, steering levers pivotally supported by the said frame and arranged at the outer ends of the cross shafts and provided with axle spindles, road wheels mounted on the said spindles, beveled toothed pinions secured to the said road wheels, beveled toothed wheels connecting the said pinions in pairs, a connection between the steering levers, and rods operatively connecting the friction driving wheels with the steering levers, so that the road wheels are driven at unequal speeds in rounding curves.

2. The combination, with a frame, and two driving shafts journaled longitudinally in the frame and arranged side by side; of friction driving disks secured on the said shafts, beveled toothed driving pinions also secured to the said shafts, a revoluble driving wheel having a revoluble beveled toothed equalizing pinion mounted in it, beveled toothed wheels secured back to back in pairs each pair revolving independent of the other and the inner wheels gearing into the said equalizing pinion and the outer wheels gearing into the said driving pinions, two cross shafts arranged in line with each other, slidable friction driving wheels splined on the said cross shafts and bearing against the said disks, beveled toothed pinions secured on the said cross shafts, steering levers pivotally supported by the said frame and arranged at the outer ends of the cross shafts and provided with axle spindles, road wheels mounted on the said spindles, beveled toothed pinions secured to the said road wheels, beveled toothed wheels connecting the said pinions in pairs, a connection between the steering levers, and rods operatively connecting the friction driving wheels with the steering levers, so that the road wheels are driven at unequal speed in rounding curves.

3. The combination, with a frame, of two driving shafts journaled longitudinally in the frame, means for revolving the said shafts, friction driving disks secured on the said shafts, two cross shafts journaled in the said frame, slidable friction driving wheels splined on the said cross shafts and bearing against the said disks, steering levers pivotally supported by the said frame and provided with axle spindles, road wheels mounted on the said spindles, driving connections between the said cross shafts and road wheels, a connection between the steering levers, and rods operatively connecting the friction driving wheels with the steering levers.

In testimony whereof I have affixed my signature in the presence of two witnesses.

LOUIS HERMAN.

Witnesses:
 ALBERT MILLER,
 JOHN GENZLING.

Copies of this patent may be obtained for five cents each, by addressing the "Commissioner of Patents, Washington, D. C."